United States Patent [19]

Olry

[11] Patent Number: 4,790,052

[45] Date of Patent: Dec. 13, 1988

[54] PROCESS FOR MANUFACTURING HOMOGENEOUSLY NEEDLED THREE-DIMENSIONAL STRUCTURES OF FIBROUS MATERIAL

[75] Inventor: Pierre Olry, Bordeaux, France

[73] Assignee: Societe Europeenne De Propulsion, Surenes, France

[21] Appl. No.: 877,254

[22] Filed: Jun. 23, 1986

Related U.S. Application Data

[63] Continuation-in-part of Ser. No. 685,056, Dec. 20, 1984, Pat. No. 4,621,662.

[30] Foreign Application Priority Data

Jun. 27, 1985 [FR] France ............................ 85 09820
Jun. 27, 1985 [FR] France ............................ 85 09821

[51] Int. Cl.⁴ ...................... D04H 1/46; D04H 3/10; D04H 5/02
[52] U.S. Cl. ........................................ 28/110; 28/114; 28/143; 156/148
[58] Field of Search ................ 28/107, 110, 113, 114, 28/143; 156/148

[56] References Cited

U.S. PATENT DOCUMENTS

| | | | |
|---|---|---|---|
| 2,930,100 | 3/1960 | Rust, Jr. | 28/110 |
| 3,090,101 | 5/1963 | Chagnon et al. | 28/110 |
| 3,250,493 | 5/1966 | Burkley et al. | |
| 3,508,307 | 4/1970 | DiLo | 28/110 |
| 3,540,096 | 11/1970 | Porta | |
| 3,555,638 | 1/1971 | O'Byrne | 28/110 |
| 3,673,024 | 6/1972 | Eriksson | |
| 3,772,115 | 11/1973 | Carlson et al. | |
| 3,909,891 | 10/1975 | DiLo | |
| 3,909,893 | 10/1975 | Wilde | 28/110 |
| 3,971,669 | 7/1976 | Wrzesien et al. | |
| 3,994,762 | 11/1976 | Wrzesien et al. | |
| 4,085,486 | 4/1978 | DiLo | 28/110 |
| 4,284,680 | 8/1981 | Awano et al. | 28/107 X |

FOREIGN PATENT DOCUMENTS

| | | |
|---|---|---|
| 1660786 | 10/1970 | Fed. Rep. of Germany |
| 2324985 | 1/1974 | Fed. Rep. of Germany |
| 2434242 | 1/1976 | Fed. Rep. of Germany |
| 1570992 | 6/1969 | France |
| 2378888 | 8/1978 | France |
| 2414574 | 8/1979 | France |
| 2506672 | 12/1982 | France |
| 931611 | 7/1963 | United Kingdom |
| 1308999 | 3/1973 | United Kingdom |
| 1380518 | 1/1975 | United Kingdom |
| 1549687 | 8/1979 | United Kingdom |
| 2012671 | 8/1979 | United Kingdom |
| 2048424 | 12/1980 | United Kingdom |
| 2099365 | 12/1982 | United Kingdom |

Primary Examiner—Robert K. Mackey
Attorney, Agent, or Firm—Weingarten, Schurgin Gagnebin & Hayes

[57] ABSTRACT

Method and apparatus for producing homogeneously needled three-dimensional structures formed of superposed layers of fibrous material and the needled structures produced thereby. As layers of fibrous material are added to a stack of needled layers, the needling needles are moved away from the stack so as to maintain a uniform depth of needling over the entire stack, and to achieve a uniformly needled result. To permit the same density of needling in the initial layers, a substrate layer of needle penetrable material is used to support the initial layers which can then be needled as through they were layed on top of other needled layers. For the final layers, the needling rate is reduced to compensate for the lessened clogging of the needle in having fewer layers to penetrate in the final needling. Needled structures according to the invention find particular application in the manufacture of rocket motor parts, heat protective pieces, and friction pieces such as high performance brake discs or pads as used on aircraft and land vehicles.

13 Claims, 4 Drawing Sheets

PROCESS FOR MANUFACTURING HOMOGENEOUSLY NEEDLED THREE-DIMENSIONAL STRUCTURES OF FIBROUS MATERIAL

CROSS-REFERENCE TO RELATED APPLICATION

The present application is a Continuation-in-part of U.S. patent application Ser. No. 685,056 filed on Dec. 20, 1984, now U.S. Pat. No. 4,621,662, issued on Nov. 11, 1986, commonly assigned and incorporated herein by reference.

FIELD AND BACKGROUND OF THE INVENTION

The present invention relates to the formation of high uniformity in needled structures particularly for use as reinforcing structures in forming rocket motor parts, heat protective pieces and high performance brake discs or pads as used on aircraft and land vehicles.

Brake discs of the type presently used in jet aircraft and Formular One racing must endure very high braking loads and the resulting shear forces that are experienced in the brake disc material. In the case of aircraft brakes, the thickness of the disc may be two inches thus accentuating the shear on the disc material.

To withstand such shear forces, the discs must be manufactured to great accuracy so that there is as much uniformity in the disc material as is possible. A nonuniform disc material would create local stress concentrations that will increase the possibility of pad failure.

One method of manufacturing such brake disc in the past has used the technology of needling together a plurality of layers of a fibrous material which is then carbonized and densified by a matrix material, for example by carrying out a chemical vapor deposition process, to obtain a composite brake disc. The uniformity of the resulting brake disc is a function of the uniformity of the needling process. Prior needling processes have however suffered from lack of uniformity resulting from the fact that in bonding together a thick stack of many layers, the needling effects differently the layers at the top than those at the bottom. As the needles used in needling penetrate the layer of material, they pick up and become clogged with the fibers of the fibrous material. As a result, the needles become increasingly less effective in producing the interlayer fiber crosslinking as they penetrate the stack of layers. The result is a non-homogeneously needled stack. In the critical applications of high performance brake discs, it is then impossible to optimize the needling throughout the layers. If it is optimized at the top of the stack, the needling variations throughout the stack will produce suboptimal results at the bottom, and vice-versa. It thus becomes difficult to realize the required disc strength throughout its thickness.

With regard to the prior art, a known process for manufacturing flat structures by needle superposed layers of fibrous fabric is described in U.S. Pat. Nos. 3,971,669 and 3,994,762. According to this known process, flat unidirectional layers are superposed in crisscrossed fashion and then needled. Although no limitation is given as to the number of superposed layers, this document gives no indication as to the means that should be used for producing a thick structure with homogeneous characteristics therethrough.

French Pat. No. 2,414,574 discloses a process for manufacturing fibrous reinforcements for brake discs, by forming rings of felt by needling, stacking the rings one over the other until the required thickness is reached, and maintaining the resulting stack for eventual densification. It is indicated that the stack of rings can be needled, but no description is given as to what method is used to this effect.

British Pat. No. 1,549,687 also discloses a process for manufacturing fibrous reinforcements for brake discs. Annuli of a fibrous material are plied together to form a stack which is passed through a needle-punch loom. Further series of plies may be added to the initially needled stack and the resulting stack is passed through the needle-punch loom. The needle penetration can vary from one needling pass to the other, but the result does not appear to be an homogeneously needled structure. In addition, the thickness of the stack is limited by the height of the loom. Compression of the stack between needling passes, as suggested, will not help in obtaining structures with uniform needling density and with unlimited thickness.

Regarding now the manufacturing of cylindrical structures by needling layers of fibrous fabric, British Pat. No. 2,099,365 describes a process which consists in winding a sheet of fibrous fabric on a cylindrical mandrel and carrying out a needling operation on the sheet while on the mandrel. This document, however, gives no indication as to what means to use in order to effectively produce a thick structure with a constant needling density right through the thickness of the structure. The same applies to French Pat. No. 2,378,888 and to U.S. Pat. No. 3,772,125, and to the prior art documents relating to the production of tubular structures thin walls (such as for example FR No. 1,570,992, GB No. 2,048,424 and U.S. Pat. No. 3,909,893).

Now it has been found that the technique of needling through small thicknesses is not readily adaptable to large thicknesses. One reason for this is that, once they have penetrated to a certain thickness in the superposed layers, the needles loose their effectiveness because their barbs become clogged up with pieces of fibers torn from the layers of materials gone through by the needles; the needles cannot thus fulfill their function correctly, and as a result, the same needling characteristics cannot be obtained throughout the whole stack.

Yet structures destined to be subjected to strong thermo-mechanical stresses as in brake discs, it is important to keep the properties constant throughout the structure, in order for example, to avoid delamination.

It is the object of the present invention to propose a process permitting the production of thick three-dimensional structures by needling of superposed layers, with a constant density of needling throughout the thickness of the structure, to allow the production of homogeneous fibrous structures with a constant density of fibers throughout the structures.

SUMMARY OF THE INVENTION

According to the teachings of the present invention, a process and apparatus are provided for producing homogeneity of needling of a plurality of layers of fibrous material.

This uniformity is accomplished by first superposing on a support, layers of a fibrous material in sheet form, subsequently needling each new layer onto the preceding ones as it is superposed thereon, until the required thickness is reached, and modifying the distance between the support and the needles, at each superposition of a new layer, to keep a substantially constant needling depth, right through the entire needling of the stack of layers.

The support and needles are mutually moved apart as each new layer is superposed, by a distance equal to the thickness of a needled layer. Thus, the needling is performed with a uniform density throughout the whole thickness of the structure.

The process according to the invention is applicable both in the manufacture of three-dimensional structures formed with superposed flat sheets of fibrous material, and the manufacture of three-dimensional structures of revolution, by needling of superposed layers, formed by winding of a sheet of fibrous fabric on a mandrel.

According to yet another feature of the invention, after the last layer has been stacked and once needled, finishing needling steps are carried out, with the distance between the support and the needles being modified after each finishing needling step, so that the needling density inside the upper layers is substantially equal to that in the other layers.

Additionally, as a further feature of the invention, the support is formed of a material that permits the needles to penetrate it so that the initial layers of material are needled with the same needle penetration as later layers so that their needling is of the same characteristics as later layers.

BRIEF DESCRIPTION OF THE DRAWINGS

The invention will be more readily understood on reading the following description with reference to the accompanying drawings in which.

DESCRIPTION OF THE PREFERRED EMBODIMENTS

Figure 1:
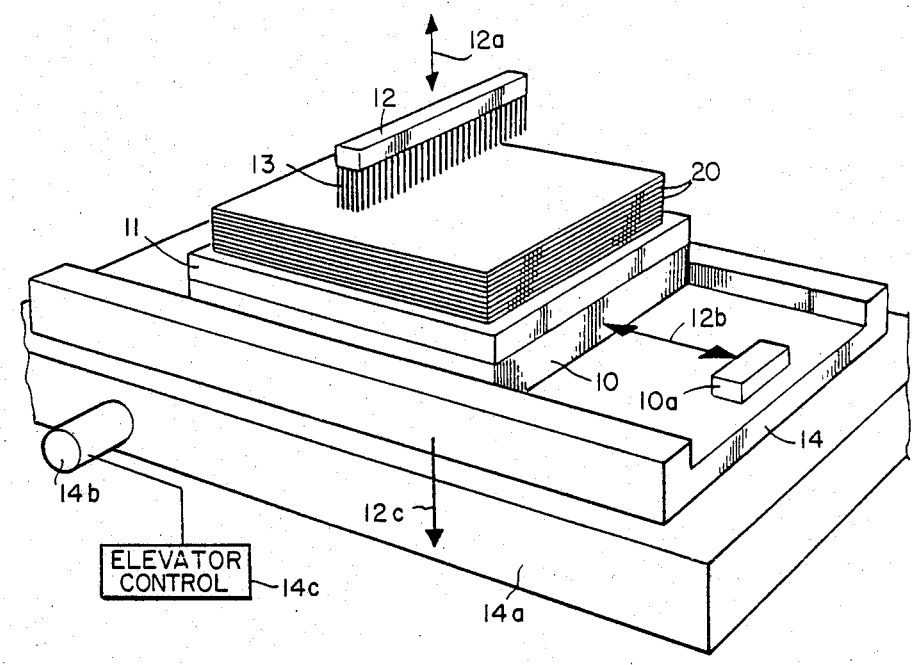
FIG. 1 is a diagrammatic view illustrating the process according to the invention for the manufacturing of three-dimensional structures by needling of flat layers.

A first embodiment of the invention will be described with reference to FIGS. 1 to 4.

On a horizontal platen 10 are brought one by one, sheets 20 of fibrous material of width and length determined as a function of the structure to be produced. Said sheets 20 are stacked one on top of the other and bonded together by needling using a needle board 12. The board 12 is situated above the platen 10 and extends in parallel to one of the sides of the platen 10, and over a length substantially equal to that of the sides, the needles 13 being directed vertically downwards.

The needle board 12 is integral with a driving device (not shown) which, in manner known per se, imparts to the needles a vertical reciprocating motion 12a.

The needle board 12 and the stack of sheets 20 are additionally movable one with respect to the other, horizontally and vertically. Horizontally, the platen 10 is, for example, reciprocally driven in motion 12b with respect to a support table 14, perpendicularly to reciprocal motion of the board 12, under the action of reciprocal driving means 10a mounted on the table 14. Vertically, the platen 10 and the board 12 are driven apart in steps 12c, for example, achieved by driving the table 14 relative to the needling board by an elevator 14a with a motor 14b under control of a controller 14c or an endless screw or other coupling means mounted on the support frame of the needle board. Vertical control means are shown more fully in the above-identified parent application incorporated herein by reference.

The manufacture of a structure is carried out as follows:

A first sheet of material is placed on the platen 10, is needled, and then a second sheet is placed over it and needled thereto, the needle board 12 being moved according to reciprocal vertical movement 12a whereas the platen is moved horizontally in motion 12b over a length at least equal to that of the sheet 20, in order to cause these to be needled over their entire length by the board 12. When the platen 10 has reached one end of its stroke, a new sheet 20 is stacked over the others and the table 14 is lowered a step distance 12c corresponding to the thickness "e" of a needled strip, before another needling cycle is performed by moving the platen 10 to the other end of its stroke. The procedure is thus continued, the platen 10 being supplied with a new sheet at each end of its horizontal stroke, until the height required for the structure is reached.

At every penetration of the needles, their barbs carry with them some fibers from the material of each sheet which they penetrate, the fibers thus carried by the barbs creating vertical cross-linked bonds between the superposed layers.

Figure 2:
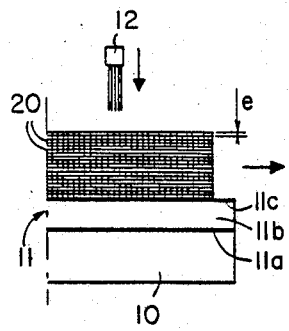
FIGS. 2 to 4 are cross-sectional views of different stages in the production of a structure with the process illustrated in FIG. 1.
Figure 3:
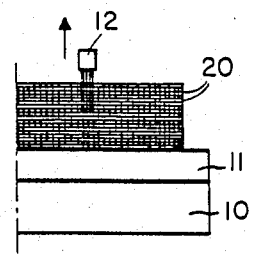

FIGS. 2 and 3 show the needles respectively in high and low position. The needles penetrate into the texture through a depth equal to several times the thickness of a needled sheet 20 (such as for example 8 times and typically less than the total number of sheets to be stacked). The needling depth is kept constant throughout the entire operation due to the progressive lowering of the structure with respect to the needles. It is necessary, for needling the first sheets on the platen 10, to provide means preventing the needles 13 from abutting against the hard surface of the platen 10. To this end, the platen 10 is provided with a top layer 11 into which the needles can penetrate without any risk of being damaged and without carrying back particles or fibers into the structure to be produced.

Said layer 11 can, for example, comprise a sheet 11a of reinforced elastomer (such as, for example, reinforced "Hypalon" or a "Nylon" material) fixed to the platen 10 and on which is adhesively fixed a layer 11b formed of a felt base (for example, a polypropylene felt) o sufficient thickness for the needles to penetrate, during the first needling strokes, through the provided needling depth without touching the platen 10. On said felt base is adhesively fixed another sheet 11c, for example of polyvinylchloride. During the needling, the sheet 11c is traversed through by the needles but inhibits fibers from the material of the sheets 20 being thrust into a linking with the felt base which would complicate the separation of the completed structure from the layer 11.

Figure 9:
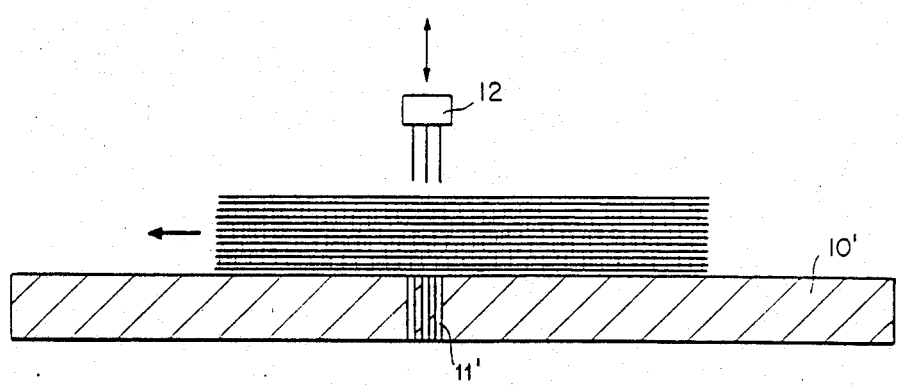
FIGS. 9 and 10 are diagrammatic sectional views illustrating other embodiments of the process according to the invention for the manufacturing of three-dimensional flat structures and of three-dimensional structures of revolution, respectively.

It will be noted, as a variant, that it is possible either to keep the platen immobile horizontally and thus to move the needle board, or to conduct the needling on a perforated platen with holes 11' aligned with the needle position on each stroke as shown in FIG. 9. In this case, the platen 10' need not be covered with a surface layer such as layer 11. The platen 10 is immobile respect to the needle board 12 in horizontal direction, therefore it is the stack of sheets which is moved horizontally on the platen at every needling stroke.

Figure 4:
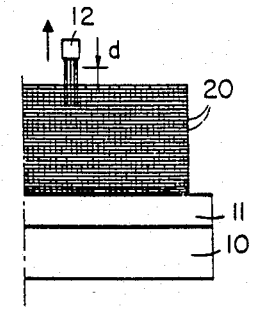
Figure 5:
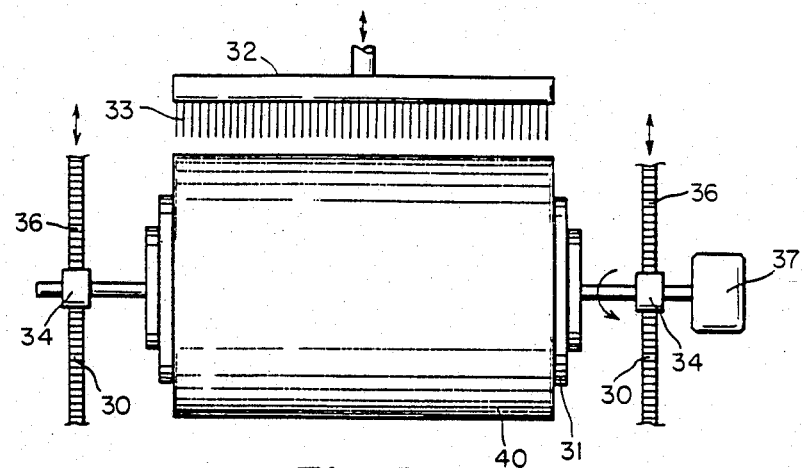
FIG. 5 is a diagrammatic view illustrating the application of the process according to the invention to the manufacture of three-dimensional structures of revolution.

In order to obtain a constant needling density through the whole thickness of the structure, different finishing needling cycles are used after needling of the last sheet. As the supports are stepped apart without the addition of a new layer, the needles then go through an increasing distance "d" in the air before reaching the structure and arriving to the end of their downstroke (FIG. 4). The barbs are thus less clogged than if they had to go an equal distance "d" through the fibrous fabric. The needles are thus increasingly effective during the finishing needling strokes. Therefore, to avoid denser needling in the upper layers, the number of finishing operations or strokes carried out (four for example) is less than (eight) which would have been used with the addition of a new layer at each stroke.

The sheet of fibrous material may be supplied in different forms, particularly depending on the proposed application.

Figure 11:
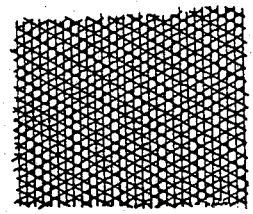
FIGS. 11 to 14 are diagrammatic views illustrating various forms of fibrous material which can be used for carrying out the process according to the invention.

For example, the fibrous material may be at least partly constituted by a layer of discontinuous fibers obtained by carding (card webs), or by a layer of continuous fibers obtained by criss-crossing unidirectional webs of continuous yarns or tows followed by low density needling (pre-needling) of the layer together as shown in FIG. 11. In the latter case, the criss-crossing can be achieved as already known per se, namely by lapping. To achieve this, one of the unidirectional webs of yarns or tows is continuously supplied whereas another unidirectional web of yarns or tows is superposed thereon by reciprocal movement in a direction perpendicular to the movement of the web. Due to the relative displacement between the unidirectional webs, what is obtained is in fact three superposed webs forming between them angles different from 90°, for example angles of 60°.

Figure 12:
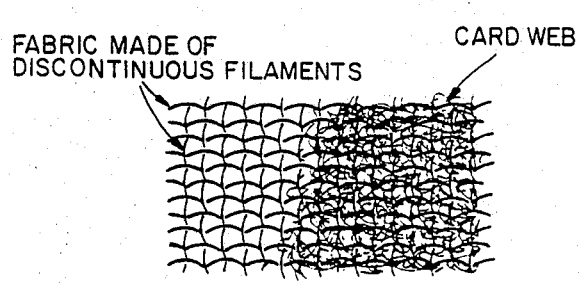
Figure 13:
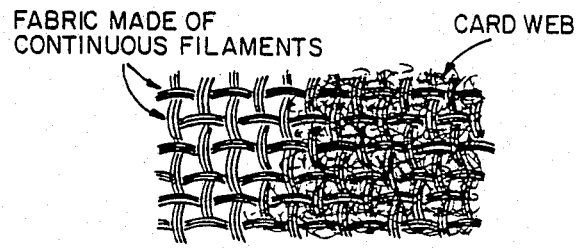
Figure 14:
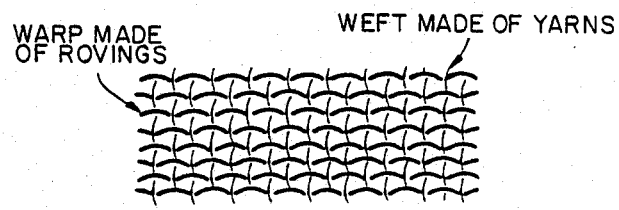

When greater mechanical strength is required for the structure due to the properties needed for the final composite fabric to be produced, the fibrous material is constituted by at least one woven layer, which is, for example:

a complex constituted by a fabric of continuous or discontinuous fibers (satin or plain weave type) as shown in FIGS. 13 and 12, respectively on which has been needled, with low needling density a web of discontinuous fibers obtained by carding (card webs) or a web of continuous fibers, such as a web being deposited over the fabric by lapping, or a fabric on its own, constituted by yarns in the warp direction, said yarns being continuous or discontinuous, and by a roving in the weft direction (FIG. 14).

The fibers constituting the materials described hereinabove may be any natural, artificial or synthetic fibers, used either such as they are or after heat treatment, the choice of the nature of these fibers being dependent on the proposed application.

In the case of the manufacture of reinforcement structures for composite materials destined to withstand great thermomechanical forces, the most advantageous fibers are the carbon fibers and the ceramic fibers (alumina, silicon carbide, etc.) as well as any fiber precursors of such fibers, or any fibers constituting an intermediary between such precursor fibers and the fully heat-treated fibers.

When the three-dimensional structure is entirely or partly produced from precursor or intermediate fibers, it has to undergo later a heat-treatment to confer to the fibers the maximum mechanical properties.

This last manner of proceeding protects the fibers against breaking in the case where the heat-treated fibers have modules that are too high and transversal strengths that are too low to be needled without any damage, as this is the case with carbon and ceramic fibers. Thus the materials described hereinabove can be constituted at least partly with carbon and ceramic precursor fibers, any remaining fibers being in carbon or ceramic.

For example, the fibrous material destined for needling is constituted by a complex formed of a highly resistant fabric or carbon fibers, pre-needled with a card web of stabilized P.A.N. fibers (polyacrylonitryle, a carbon precursor). In this complex, the fabric brings the required mechanical strength whereas the web of fibers permits a non-destructive needling of the superposed sheets, since the barbs of the needles, in loading themselves with the stabilized P.A.N., cannot seriously damage the carbon fibers. For economical reasons, the fabric will be selected to be as light as possible in view of the required mechanical properties, for example with a weight varying between 100 and 600 g/m2.

It is of course possible in the preceding example to replace carbon fibers and/or precursors independently by ceramic fibers and/or precursors. And, in reverse, a fabric in carbon or ceramic precursor fibers may be combined with a card web in carbon or ceramic fibers.

In the same way, carbon or ceramic fibers and precursor fibers of carbon or ceramic can be combined and form, independently one from the other, the warp and weft of a fabric constituted by yarns of continuous or discontinuous filaments in the warp direction and by a roving in the weft direction. A special example of manufacture of a three-dimensional structure destined to the production of brake discs in carbon-carbon composite material is given hereunder.

EXAMPLE 1

The production of sheets of fibrous material starts with tows of polyacrylonitryle (P.A.N.) fibers such as those commercialized by the British company COURTAULDS, under the denomination Courtelle SP30, a tow being composed by 160,000 filaments. After pre-oxidation, unidirectional webs are formed by placing a plurality of tows one next to the other. A sheet of fibrous material is obtained by spreading and/or lapping one web over another in the manner indicated hereinabove, this giving three unidirectional layers between which the rows are offset by 60°, then by a light needling, the sole object of which being to bond the layers together sufficiently to allow the handling of the sheet. Said sheet is stored on a roll.

The sheet is cut into pieces, the length and width of which correspond to the length and width of the structure to be produced. The pieces of sheet are then stacked onto a platen, being each time needled to the preceding ones in the manner described hereinabove. The number of needles carried by the needle board and the frequency at which said board is actuated for a given horizontal speed of the platen, are determined so as to obtain the required needling density, which in the present example is about 48 strokes or needle penetrations per cm2. The depth of penetration is determined as a function of the number of layers to be traversed through by the needles, for example about 20 layers. After each needling operation, the platen is lowered with respect to the needles a value equal to the thickness of one needled layer, which, in this example, is about 0.8 mm. After the needling of the last deposited sheet, a predetermined number of finishing needling cycles are performed; in this case, this number is equal to 6 (three return-strokes of the platen).

To produce a brake disc from such a structure, a ring is cut therefrom and subjected to the normal operations of carbonization (so as to transform the pre-oxidized P.A.N. into carbon) and of densification by chemical vapor infiltration of pyrocarbon (CVI) in several cycles until a density of about 1.75 is obtained.

A second application of the process according to the invention will be described with reference to FIGS. 5 to 8.

A sheet 40 of fibrous material is wound in continuous manner on a mandrel 30 driven in rotation about a horizontal axis. The mandrel, which in this case is cylindrical with circular cross-section, has a profile corresponding to that of the axi-symmetrical structure to be produced, whereas the sheet 40 has a width corresponding substantially to that of said structure. The sheet 40 is wound on the mandrel to form superposed layers which are joined together by needling, by means of a needle board 32. The needle board is situated above the mandrel 30 and extends in parallel to the axis of the latter over a length at least equal to the width of the sheet 40. Needles 33 of the board 32 are directed vertically downward.

In addition to the reciprocal vertical motion, the needle board 32 and the mandrel 30 are movable one with respect to the other in a vertical direction. To this effect, the shaft of the mandrel passes through bearings mounted in supports 34 movable vertically with respect to the frame on which is mounted the needle board. The vertical displacement of the supports 34 is produced by means of stepper motors which are controlled synchronously to each other and which drive toothed wheels on which mesh endless chains 30, the support 34 being fixed on the latter. The mandrel 30 is continuously driven in rotation by a motor 37 provided at one end of the axis of the mandrel.

A constant needling density per unit of surface is achieved by varying the rotational speed of the mandrel as a function of the diameter of the structure being formed, the needling frequency being constant. Of course, a similar result could be obtained by varying the needling frequency (i.e. the frequency of needle strikes), the rotational speed of the mandrel remaining constant.

Each time another layer is formed by winding the sheet 40 on the turning mandrel 30, the mandrel is lowered with respect to the needle board by a distance corresponding to the thickness "e" of the needled layer, and a new needling cycle is performed.

Simultaneously to the winding, the sheet 40 is needled onto the preceding layers at the very location where the sheet is superposed on, and tangent to the latter. At each penetration of the needles, the asperities or barbs of the needles carry with them fibers from the material of the layers traversed, these fibers creating radial bonds between the superposed sheets.

Figure 6:
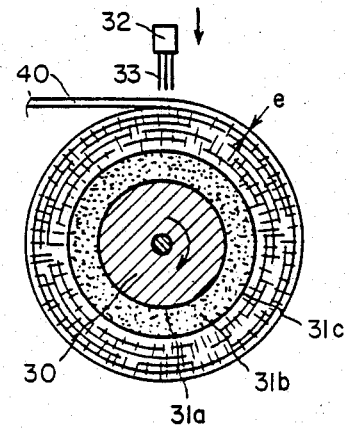
FIGS. 6 to 8 are cross-sectional views illustrating diagrammatically the application of the process according to the invention to the manufacture of three-dimensional structures of revolution.
Figure 7:
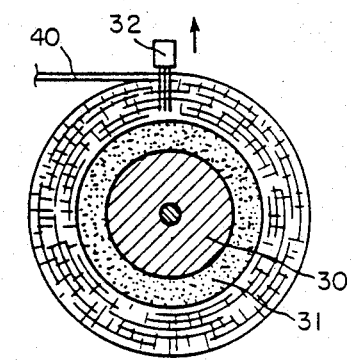

FIGS. 6 and 7 show the needles respectively in the high position and in the low position. The needles penetrate into the layers through a depth equal to several times the thickness of a needled layer (for example, eight times). Due to the progressive lowering of the mandrel 30 with respect to the needles, the needling depth is kept constant throughout the process.

In order to be able to needle the first layers on the mandrel 30, it is necessary to provide means that prevent the needles 33 from hitting the hard surface of the mandrel 30. To this effect, the mandrel 30 is coated with a base layer 31 which the needles can penetrate without being damaged and without carrying particles or fibers into the structure to be produced. The coating 31 can for example be constituted of the same elements as layer 11 described hereinabove.

To prevent the formation of circumferential lines of needle strokes resulting from consistent placement of each stroke which impair the homogeneity of the resulting structure, a reciprocal displacement of small amplitude in axial direction is made between the mandrel 30 and the needle board 32. This is achieved for example by imparting to the needle board a horizontal to-and-fro movement over a small distance.

Figure 10:
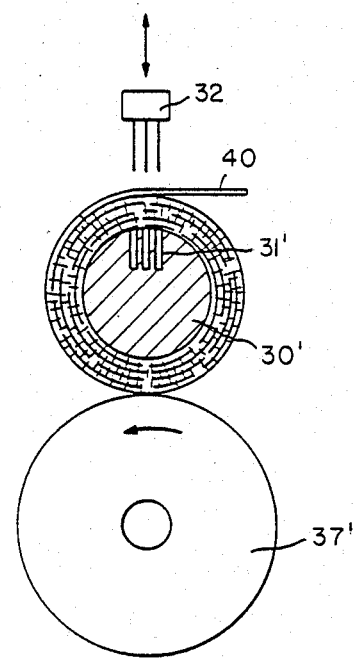

It will be noted as a variant that it is possible to carry out the needling on a perforated mandrel 30' (FIG. 10) having perforations 31' (FIG. 10) aligned to the placement of each stroke or hole of the needles of the board 32. In this case, it is not necessary to coat the mandrel with a layer 31. The mandrel is then immobile with respect to the needle board except vertically and it is the sheet, deposited on the mandrel, which is driven in order to be wound over the mandrel. In a manner known per se, the driving of the sheet 40 may be caused by one or several members such as a cylinder acting by friction on the outer surface of the structure being produced. It will be further noted that this particular driving method is applicable when using a mandrel with a layer 31, with the rotary drive operating by friction on the outer surface of the structure in place of driving the end of the axis of the mandrel by a motor.

Figure 8:
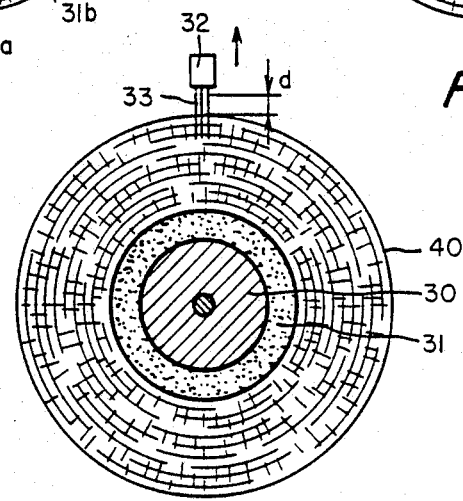

In order to obtain a constant needling density through the whole thickness of the structure, it is necessary to conduct finishing needling cycles once the last layer has been positioned and needled. The procedure then is the same as described hereinabove relative to the needling of flat sheets, taking into account the fact that the needles then go through an increasing distance "d" in the air before reaching the structure and arriving at the end of their downward stroke (FIG. 8).

The fibrous material of the sheet is selected in particular as a function of the proposed application, as described hereinabove relatively to the material of the sheet 20.

A special example of manufacture of a cylindrical structure destined to the production of brake discs in carbon-carbon is now described.

EXAMPLE 2

The operation starts from tows of P.A.N. fibers as in Example 1. After pre-oxidizing, one part of the tows is subjected to stretch breaking, crimping and weaving operations in order to obtain a fabric of about 450 g/m2, and the other part is subjected to crimping, cutting and carding operations in order to obtain a card web of about 120 g/m2. The aforementioned operations are conventional operations in the textile industry. A sheet of fibrous material is obtained by lapping and pre-needling of the card web onto the fabric, the object of the pre-needling being simply to give the sheet sufficient cohesion for subsequent handling. The sheet so produced can then be stored on a roll.

In order to form the three-dimensional structure, the sheet is wound on a mandrel while being needled to itself according to the invention. At each rotation of the mandrel, it is moved away from the needles a distance equal, in this case, to 0.9 mm, which is the thickness of a needled layer. The needling density is selected to be substantially equal to that indicated in Example 1. After the positioning of the last layer, several finishing needling cycles are conducted; these operations being carried out, in the illustrated example, over six complete rotations of the mandrel. The resulting cylindrical structures show a fiber density rate varying between 43% and 46%.

To product brake discs, the axisymmetrical structure is cut radially into rings which are thereafter subjected to the conventional operations of carbonization and densification by the CVI process as described above. The above-described system of needling can be practiced in other embodiments within the scope of the invention as defined solely in the following claims.

I claim:

1. A process for manufacturing homogeneously needled three-dimensional structures of fibrous material to be used as reinforcing structures in composite materials, said process comprising the steps of:
   superposing on a support layer after layer of fibrous material in sheet form;
   individually needling each layer with a substantially same and constant needling density per unit of surface by thrusting needling needles through said layer and to a predetermined depth below said layer;
   increasing the distance between the support and the needles by a value substantially equal to the thickness of a needled layer each time a new layer is superposed so as to keep said depth at a substantially constant value with each newly superposed layer; and
   after a final layer has been superposed and needled, carrying out additional finishing needling steps with the distance between the support and the needles being increased after each finishing needling step during which the structure is once needled over the whole outer surface of the final layer so as to have a needling density in the last superposed layers substantially equal to the inside the other layers, whereby a substantially uniform needling density is achieved through the structure.

2. A process as claimed in claim 1, wherein the number of finishing needling steps is less than would be necessary until the needles cannot reach the final layer.

3. A process as claimed in claim 1, wherein said sheet of fibrous material is formed by unidirectional webs which are superposed in criss-cross fashion and preneedled.

4. A process as claimed in claim 3, wherein the different unidirectional webs form between them angles of about 60 degrees.

5. A process as claimed in claim 3, wherein the webs are formed, independently of each other, of fibers of a material selected from the group consisting of carbon, ceramics, carbon precursors and ceramics precursors.

6. A process as claimed in claim 1, wherein said sheet of fibrous material comprises at least one fabric layer.

7. A process as claimed in claim 6, wherein said fabric is formed of continuous filaments and is preneedled together with a card web.

8. A process as claimed in claim 6, wherein said fabric is formed of a discontinuous filaments and is preneedled together with a card web.

9. A process as claimed in claim 1, wherein said sheet of fibrous material comprises at least one fabric layer which is preneedled together with a card web, said fabric and said card web being formed, independently of each other, of a material selected from the group consisting of carbon, ceramics, carbon precursors and ceramics precursors.

10. A process as claimed in claim 9, wherein the warp and the weft of the fabric are formed, independently from each other, of fibers of a material selected from the group consisting of carbon, ceramics, carbon precursors and ceramics precursors.

11. A process as claimed in claim 1, wherein support has a surface coated with a base layer designed to allow the penetration of the needles into the base layer without damaging the needles during the needling of the first layers.

12. A process as claimed in claim 1, comprising the steps of superposing flat sheets of said fibrous material on said support in the form of a platen; individually needling each sheet over its whole surface by moving the needles and the platen with respect to each other in a direction perpendicular to the movement of the needles during needling; and superposing a new sheet on the preceding one at the end of a stroke in said direction.

13. A process as claimed in claim 1, wherein a continuous strip of said fibrous material having a width substantially equal to the axial dimension of an axisymmetrical structure to be manufactured is wound on a support in the form of a mandrel so as to form superposed layers.

* * * * *